Sept. 18, 1973   P. R. VOYENTZIE ET AL   3,759,749
READILY MANUFACTURABLE THERMAL CELL UNIT
FOR EXPLOSIVE PROJECTILES
Original Filed March 5, 1968

INVENTORS:
PETER R. VOYENTZIE,
RICHARD T. ZIEMBA,
RAYMOND K. SUGALSKI,

United States Patent Office 3,759,749
Patented Sept. 18, 1973

3,759,749
READILY MANUFACTURABLE THERMAL CELL UNIT FOR EXPLOSIVE PROJECTILES
Peter R. Voyentzie, 1476 NW. 21st Ave., Gainesville, Fla. 32601; Richard T. Ziemba, 99 S. Cove Road, Burlington, Vt. 05401; and Raymond K. Sugalski, 619 NW. 40th Terrace, Gainesville, Fla. 32601
Original application Mar. 5, 1968, Ser. No. 710,578. Divided and this application Jan. 22, 1969, Ser. No. 804,731
Int. Cl. H01m 1/00
U.S. Cl. 136—175
4 Claims

ABSTRACT OF THE DISCLOSURE

A projectile containing an explosive is provided with a fuse mechanism powered by an acceleration activated thermal cell unit which is constructed to be safely and conveniently manufactured. A terminal assembly is manufactured by positively attaching a terminal pin to a heat cup and then placing an igniting means and thermitic material therein. A separately fabricated assembly includes spaced inner and outer shells which are separated by a thermally fusible electrolyte. During fabrication the electrolyte is fused to decrease internal resistances within the cell. First and second electrode materials lie between the shells in contact with the outer and inner shells respectively.

RELATED APPLICATION

Figure 1:
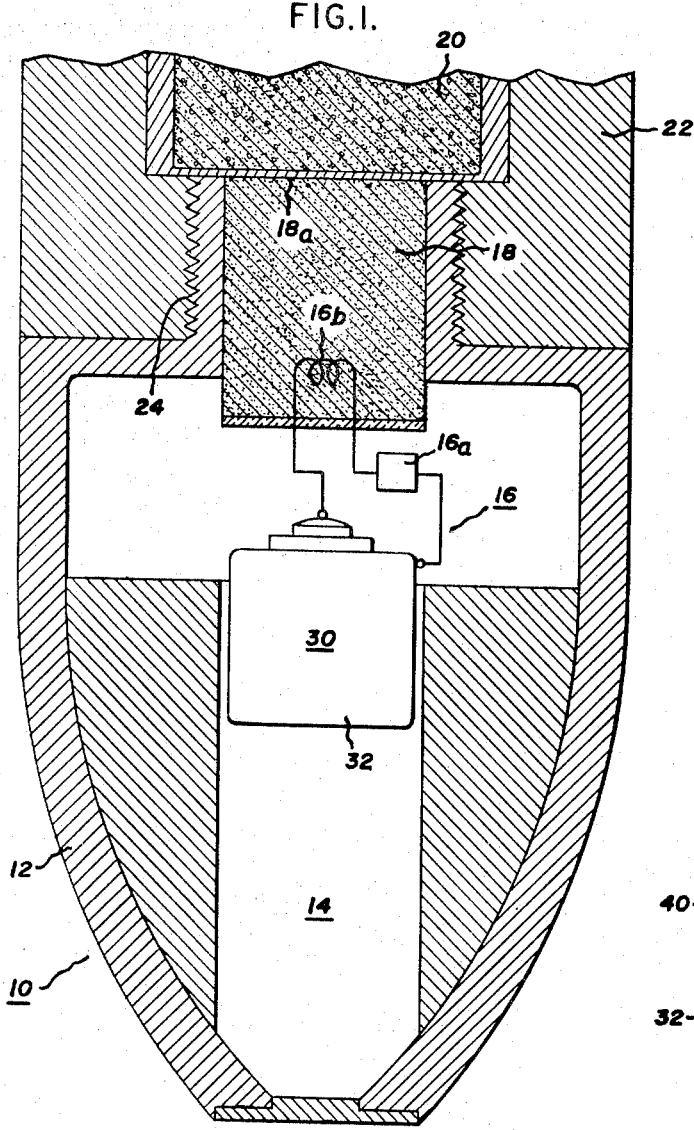

This application is a division of Ser. No. 710,578, filed Mar. 5, 1968.

Our invention is directed to a novel thermal cell unit and to an advantageous method for its manufacture.

As used herein the term "thermal cell" designates a device capable of converting chemical energy into electrical energy when raised to a predetermined temperature level. An exemplary thermal cell unit construction and application therefor is disclosed by Ziemba in patent application Ser. No. 695,144, filed Jan. 2, 1968, the disclosure of which is here incorporated by reference. Ziemba discloses an H.E. explosive shell incorporating a thermal cell unit that must supply electrical power to the fuse mechanism of the shell within a few milliseconds after the shell is fired. The thermal cell unit of Ziemba is particularly advantageous for low caliber H.E. explosive shells, since it is capable of rapidly developing power levels equal to those of prior known thermal cell units while exhibiting substantially less volume displacement.

It is an object of our invention to provide a novel thermal cell unit construction and process for its manufacture, the manufacturing process being safer, more convenient, and of greater reliability than those heretofore employed and the cell construction exhibiting greater reliability.

This and other objects of our invention are accomplished in one aspect by providing in a thermal cell unit comprised of an outer shell having one closed end and one open end, the outer shell being electronically conductive to form one terminal of the cell unit. An inner shell is provided having one closed end adjacent the outer shell closed end and one open end adjacent said outer shell open end, said inner shell being electronically and thermally conductive and spaced from said outer shell to form a current collector. A first electrode material lies within the outer shell and in electronically conductive relation therewith. A second electrode material lies in contact with the inner shell in electronically conductive relation therewith. Thermally fusible electrolyte means lies between the inner and outer shells. A terminal assembly is provided comprised of a heat cup telescope within the inner shell. The heat cup is electronically and thermally conductive and has an end wall adjacent the open end of the inner shell. A terminal pin contacts the end wall. Means are provided to positively attach the terminal pin to the end wall of the heat cup. Annular closure means insulate and seal between the terminal pin and the outer shell. Thermitic material lies within the heat cup and in thermally conductive relation therewith and spaced from the end wall. Means for igniting the thermitic material in response to rapid acceleration of the projectile is located adjacent the thermitic material.

In a second aspect our invention is directed to a process of fabricating a thermal cell unit comprising positively attaching a terminal pin to the end wall of a thermally and electronically conductive heat cup. Subsequently an acceleration responsive igniting means is inserted into the heat cup, and a body of thermitic material is located within the heat cup in thermally conductive relation therewith. The heat cup is telescoped into an assembly comprised of inner and outer concentric shells. A thermally fusible electrolyte material lies between the shells, a first electrode material lies in contact with the outer shell, and a second electrode material lies in contact with the inner shell. An insulating seal is provided between the terminal pin and the outer shell.

Figure 3:
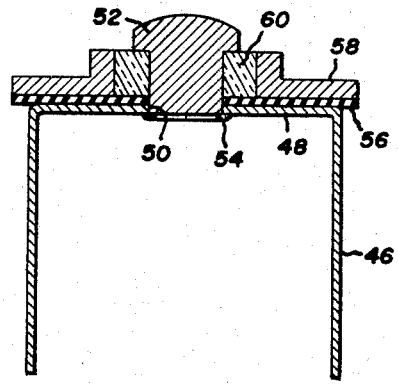
Figure 4:
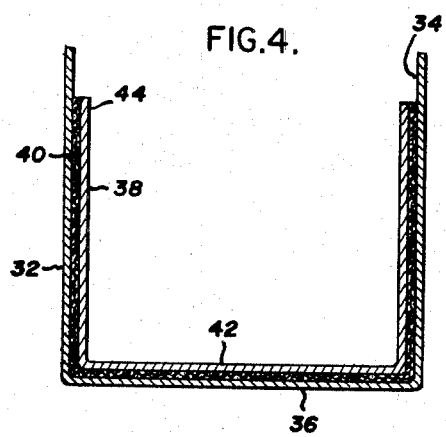
Figure 2:
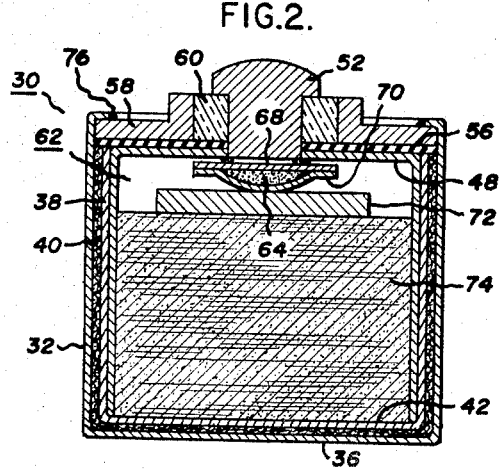

Our invention may be better appreciated by reference to the following detailed description and the accompanying drawings, in which FIG. 1 is a vertical section of a projectile,
FIG. 2 is a vertical section of a thermal cell unit,
FIG. 3 is a vertical section of a terminal assembly, and
FIG. 4 is a vertical section of a shell assembly.

Turning now to FIG. 1, indicated generally at 10 is a partial view of an H.E. artillery or cannon shell of a relatively small caliber, e.g., 20 mm. or larger. The shell has an outer housing or hollow nose portion 12, a cavity 14, and a fuse mechanism including electrical circuit means, indicated generally at 16. The electrical circuit is arranged to set off a detonator charge 18. The main or H.E. charge 20 is contained within the main shell body 22. The nose 12 containing the electrical fusing circuitry and detonator charge is threadedly engaged at 24 with the main shell body. Indicated generally at 30 is the improved miniature thermal cell unit of our invention.

The construction of the shell assembly for the thermal cell unit 30 is best appreciated by reference to FIGS. 2 and 4. The shell assembly is formed of an outer shell 32 having an open end 34 and a closed end 36. The inner shell 38 is mounted within the outer shell and spaced therefrom by an electrolyte material 40. The inner shell has a closed end 42 and an open end 44, which lie adjacent the closed end and open end, respectively, of the outer shell. The outer shell serves as a casing for the shell and as one terminal, usually the negative terminal. The chemically active anode and cathode materials to be incorporated in the cell are not shown as separate structural elements. This is attributable to the fact that since the cell is required to deliver power for only a few seconds or fractional seconds, extremely small quantities of chemically active anode and cathode materials are required. Further, cathode materials are frequently dispersed within the electrolyte.

The choice of suitable materials for fabrication of the shell assembly shown in FIG. 4 is generally understood by those skilled in the art and per se forms no part of our invention. Typically the outer shell is constructed of a structurally strong electronically conductive material, such as steel, while the inner shell is preferably highly thermally and electronically conductive. Therefore the inner shell is preferably formed of copper or brass with an exterior nickel coating to prevent chemical attack. The electrolyte must be formed of an ionically conductive material which is solid at expected ambient temperatures but fusible at a predetermined elevated temperature. A preferred form of electrolyte consists of a woven glass cloth or tape impregnated with a eutectic mixture of alkali halide salt, e.g. an alkali chloride eutectic, such as lithium and potassium chlorides, which have a melting point in the range of 300–400° C. Other fusible salts and salt mixtures having dissimilar melting ranges may be utilized, if desired. The electrolyte may comprise a pelletized material having an inorganic binder; but for most applications the impregnated woven fiberglass cloth is sufficient as a separator between the shells. Where the outer shell serves as the negative terminal a thin layer of anode material is positioned adjacent the inner surface. Magnesium and calcium are two exemplary suitable anode materials. In view of the small quantities of active anode material required, the anode material may be provided merely by forming the outer shell from magnesium or calcium clad steel. The cathode material, e.g. ferric oxide, vanadium pentoxide, or potassium chromate, may be simply dispersed in the electrolyte material prior to fabrication. Alternately, a separate cathode element formed of one of these materials may be adhered to the outer surface of the inner shell. It is recognized that a variety of compatible anode, cathode, and electrolyte materials are known in addition to the preferred compositions specifically set out and may be substituted singly or in combination for those disclosed.

The elements of the shell assembly shown in FIG. 4 are constructed and fitted into the depicted arrangement by conventional fabricating techniques. After this is accomplished it is our innovation that the assembly is then heated to the fusion temperature of the electrolyte material. This facilitates eliminating void spaces from the electrolyte, which would otherwise contribute to a high internal resistance for the cell unit. Also, the intimacy of association of the shells, anode and cathode materials, and electrolyte is improved, so that contact resistances at the interfaces of these elements are reduced. It is a salient feature of our invention that this step is performed on the shell assembly while it is still physically separated from the remaining cell structure. In many conventional cell structures fusion of the electrolyte after the electrode materials are in position would be impossible, since the construction requires thermitic material to be in place at time of assembly. Thus, high internal resistances are commonplace with conventional cell constructions.

The terminal assembly is shown in FIGS. 2 and 3. As shown, the assembly is formed of a heat cup 46 having an end wall 48. The wall contains a central aperture 50. A terminal pin 52, which usually forms the positive terminal of the cell unit, extends through the aperture and is positively attached to the end wall of the heat cup by means of a weld or soldered connection 54. The heat cup is normally formed of a highly thermally and electrically conductive material such as copper or brass. Accordingly, by reason of the weld attachment a good electrical contact exists between the terminal pin and heat cup at all times. An insulating washer 56 separates the heat cup from an annular closure 58. As shown the closure is provided with a central insulating portion 60 that seals against the terminal pin. It is a salient feature of our invention that the terminal pin is positively atached to the heat cup, rather than merely resting in contact therewith, as is characteristic of conventional cell constructions. Further, it is particularly advantageous that the elements are arranged in such a manner that the weld between the heat cup and terminal pin can be completed at a stage in assembly when no thermitic is associated with the assembly. Consequently no disadvantage of possibly igniting thermitic material by welding or soldering is created.

Noting FIG. 2, after the terminal assembly has been formed, an acceleration responsive igniting means 62 is placed in the heat cup. This igniting means in the preferred form shown is comprised of a small body 64 of a percussion sensitive explosive, such as gun powder, encapsulated between a backing plate 68 and a covering sheet 70 formed of a material such as paper. A striker plate 72 is positioned adjacent the encapsulated explosive.

A body of thermitic material 74 is then positioned in the heat cup. This heat generating material may be comprised of a quantity of so-called "gasless" heat paper, i.e. layers of paper impregnated with a suitable thermitic composition, e.g. a mixture of barium and chromate and zirconium. The paper is, of course, formed of a fibrous non-combustible material, such as fiberglass, for example. The heat generating material may take other forms, however, such as a mixture of a reductant in the form of finely powdered iron and an oxidant, such as a chromate or perchlorate.

After the igniting means and thermitic material are placed within the heat cup of the terminal assembly, the heat cup, which is sized to conform to the inner surface of the inner shell is telescoped thereinto. The upper edge of the outer shell is then bent or rolled over the outer edge of the annular closure 58 and welded thereto as indicated at 76. The weld serves to seal the cell so as to prevent any moisture accumulation therein. Where hygroscopic electrolyte materials such as, for example, alkali halides, are employed in the electrolyte material 40, it is important that the cell unit be sealed so as to avoid the possibility that electrolyte will ingest sufficient moisture so as to be rendered ionically conductive at ambient temperatures. Although the weld 76 heats the cell unit to some extent after the thermitic material is in place, the weld is made at a location relatively remote from the thermitic material so that the risk of ignition of this material is minimized. Even this small risk of ignition can be obviated by varying the cell unit construction slightly. For example, it would be a simple mechanical expedient to crimp an O-ring between the annular closure and outer shell to provide a positive seal which would entirely eliminate elevating the temperature of the cell unit after the thermitic material is placed inside. In another technique it is anticipated that terminal pin 52 may be longitudinally apertured. The thermitic material may then be placed in position within the cell unit in a slightly moist condition. When moist the thermitic material is very difficult to ignite. The weld 76 may then be formed with substantially no risk of ignition. Thereafter the thermitic material is dried by drawing a vacuum within the cell unit through the longitudinal aperture in the terminal pin. Once the moisture in the thermitic material is withdrawn in vapor form, the aperture in the terminal pin can be easily sealed by any conventional technique.

In operation, when the projectile is fired, the set-back forces of the accelerating shell "shock" the striker plate 72 against the explosive 64, so that it is suddenly squeezed between the backing and striker plates and explodes. The resulting flame ignites the thermitic material 74. As this material is consumed, the combustion process fuses and liquifies the initially solid electrolyte 40, giving rise to an electric potential between the cell terminals 32 and 52. As illustrated in FIG. 1 the voltage output between the pin 52 and outer case 32 is applied to circuit 16. Upon reaching a predetermined potential difference between the terminals a suitable switching device 16a, such as a silicon controlled rectifier, Zener diode, etc., permits current flow through a trigger coil 16b buried in the detonating fuse charge 18. Heating of the coil 16b sets off charge 18, which in turn, ignites the main H.E. charge by rupturing the thin retainer wall 18a.

During operation it may be noted that there are only minimal interal resistance losses within the thermal cell unit. Because of the fusion of the electrolyte during assembly of the shells, there is little internal resistance between the inner and outer shells. In considering this matter it is important to note that although the internal contents of the sealed cell unit are purposely chosen of materials that produce little gas upon heating, some gas is always evolved and also the gas initially within the cell unit upon heating increases in volume so that there is always some internal pressurization of the cell units. It is noted that this condition would accrue even if the cell unit were not sealed by reason of the rapid manner in which the cell is brought to the operating temperature. In may cell constructions internal pressurization poses a significant problem to reliability since many electrical interconnections depend merely upon elements resting in contact with each other. Accordingly it is quite common for the positive terminal pin to be separated from the heat cup or portions of the heat cup which are in sliding contact to separate.

In our construction the positive attachment of the terminal pin to the heat cup prevents an internal resistance from being produced at this connection point. Also, the telescopic fit of the heat cup into the inner shell works even better under pressurization, since it is pressed outwardly into firm engagement with the inner shell, which is the cathode current collector. It can then be seen that an exceedingly reliable thermal cell unit construction is provided.

It is appreciated that the thermal cell unit 30 which is described is a preferred embodiment, with numerous variations being possible. For example, although the ignition means is shown as positioned within the heat cup above the thermitic material, it could just as well be positioned below the thermitic material. Also, it is unnecessary to provide a separate backing plate for the explosive, since it may be carried either by the closed end of the inner shell or the end wall of the heat cup. The closure need not be formed partly of metal and partly of insulative material as shown, but be constructed entirely of insulative material. In this instance the insulative washer may be dispensed with. The polarity of the terminals could be reversed, if desired. Other modifications will readily occur to those skilled in the art, It is accordingly intended that the scope of our invention be determined by reference to the following claims.

We claim:
1. A process of fabricating a thermal cell unit comprising
  positively attaching a terminal pin to the end wall of a thermally and electronically conductive heat cup,
  subsequently inserting an acceleration responsive igniting means into the heat cup and locating a body of thermitic material within the heat cup in thermally conductive relation therewith,
  telescoping the heat cup into an assembly comprised of inner and outer concentric shells, a thermally fusible electrolyte material lying between the shells, a first electrode material in contact with the outer shell, and a second electrode material in contact with the inner shell, and
  providing an insulating seal between the terminal pin and the outer shell.
2. A process of fabricating a thermal cell unit according to claim 1 additionally including forming the assembly prior to telescoping by
  placing the electrolyte material within the outer shell,
  placing the inner shell within the outer shell and in contact with the electrolyte material,
  fusing electrolyte material to minimize the voids therein and decrease its resistance, and
  allowing the assembly to cool so that the electrolyte material solidifies before the step of telescoping is performed.
3. A process of fabricating a thermal cell unit according to claim 1 in which the terminal pin is positively attached to the heat cup by welding at an elevated temperature.
4. A process according to claim 1 additionally including the steps of
  moistening the thermitic material prior to insertion in the heat cup,
  elevating the temperature of the thermitic material while in a moist condition,
  thereafter drying the thermitic material.

References Cited
UNITED STATES PATENTS

| | | | |
|---|---|---|---|
| 2,217,645 | 10/1940 | De Wilde et al. | 102—66 |
| 2,934,017 | 4/1960 | Ellett | 102—70.2 |
| 3,079,454 | 2/1963 | McGinnis | 136—90 |

HARVEY E. BEHREND, Primary Examiner

U.S. Cl. X.R.

136—83 T, 90